US008267679B2

(12) United States Patent
Cuny et al.

(10) Patent No.: US 8,267,679 B2
(45) Date of Patent: *Sep. 18, 2012

(54) MOLD DEVICE FOR FORMING GROOVES IN TIRE SHOULDER

(75) Inventors: Andre Cuny, Habay La Neuve (BE); Yacine Ouyahia, Bereldange (LU); Christophe Jean Alexis Pierre, Aubange (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/906,438

(22) Filed: Oct. 18, 2010

(65) Prior Publication Data

US 2011/0151038 A1 Jun. 23, 2011

Related U.S. Application Data

(60) Provisional application No. 61/287,456, filed on Dec. 17, 2009.

(51) Int. Cl.
*B29C 35/02* (2006.01)
(52) U.S. Cl. .......................................... 425/37
(58) Field of Classification Search .................. 425/28.1, 425/37
See application file for complete search history.

(56) References Cited

U.S. PATENT DOCUMENTS

| 1,666,883 | A | * | 4/1928 | Lambert | 425/43 |
| 3,096,541 | A | * | 7/1963 | Sindelar | 425/37 |
| 4,143,114 | A | * | 3/1979 | Smith et al. | 264/326 |
| 7,338,269 | B2 | * | 3/2008 | Delbet et al. | 425/37 |
| 8,075,294 | B2 | * | 12/2011 | Cuny et al. | 425/37 |
| 2002/0142056 | A1 | * | 10/2002 | Aperce et al. | 425/37 |
| 2007/0077320 | A1 | * | 4/2007 | Delbet et al. | 425/28.1 |

* cited by examiner

*Primary Examiner* — James Mackey
(74) *Attorney, Agent, or Firm* — June E. Rickey

(57) ABSTRACT

A mold device is described for use in a mold having a plurality of tread molding segments. Each tread molding segment has an end face for mating with an adjoining segment. The mold device includes a piston located on the segment and is actuated by the opening and closing of the mold. The piston is positioned within a first chamber and has a plunger end in communication with a working material and a spring. Each of the mold segments further includes a retractable blade assembly having a distal end in fluid communication with a second chamber. The first chamber is in fluid communication with the second chamber. Closing of the mold compresses the piston, forcing the working fluid to transfer from the first chamber to the second chamber, actuating the blade assembly.

6 Claims, 13 Drawing Sheets

Position-2

MOLD DEVICE FOR FORMING GROOVES IN TIRE SHOULDER

CROSS REFERENCE TO OTHER APPLICATIONS

This application claims the benefit of and incorporates by reference U.S. Provisional Application No. 61/287,456 filed Dec. 17, 2009.

FIELD OF THE INVENTION

The invention relates in general to tire molds, and a pneumatic tire having grooves in the shoulder area oriented in the axial direction.

BACKGROUND OF THE INVENTION

Creation of internal grooves in the shoulder area of a tire that are oriented axially may have several advantages. First, the axial grooves may decrease the heat generation in the tire that is built up when the tire is rolling. Second, the grooves may evacuate the water by the tire side during operation on a vehicle, which may improve the visibility of drivers behind the vehicle. The grooves also provide tire flexibility in the shoulder area which may improve tire performance. The grooves may also be used to mount temperature sensing devices to monitor the shoulder temperature. The grooves may be also used to install retractable stud pins for enhanced winter driving.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

BRIEF DESCRIPTION OF THE DRAWINGS

The invention will be described by way of example and with reference to the accompanying drawings in which.

DETAILED DESCRIPTION OF THE INVENTION

Figure 1:
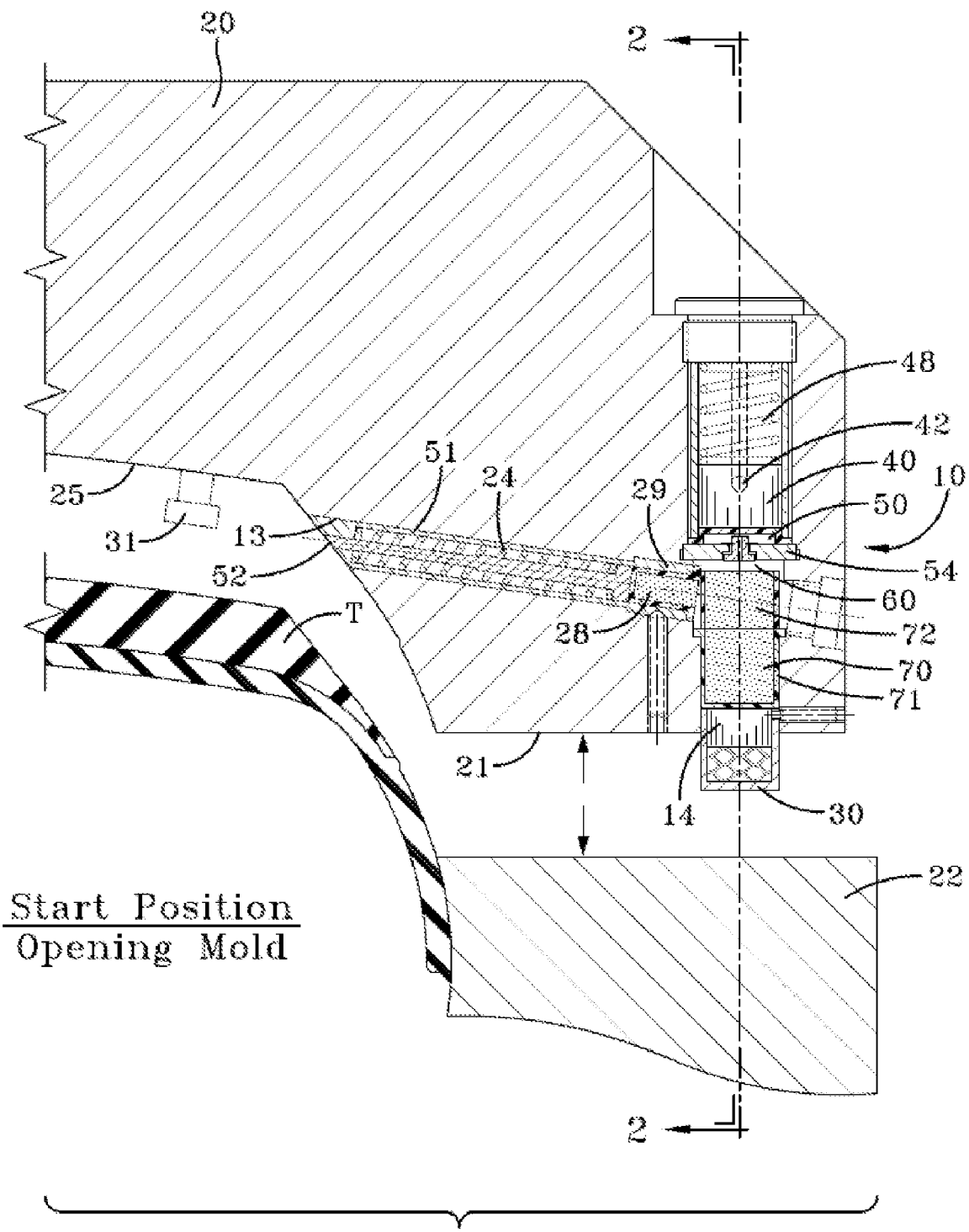
FIG. 1 is a simplified schematic of a tire mold showing part of a mold segment, tire carcass, sidewall plate and mold device, wherein the mold is in the open position.

Referring to the drawings, a first embodiment of a tire mold device 10 is shown. The tire mold device 10 is useful for molding lateral grooves in the side of a tire. The tire device 10 may be installed in a tire mold segment near the shoulder area of a tire. The tire mold typically comprises a plurality of tread molding segments 20, wherein each tread molding segment has an inner face 21 which mates with a portion of a sidewall plate 22. The tread segment further includes an inner surface 25 for molding the tire tread. The tire mold further comprises other components which have been removed for clarity, and are otherwise known to those skilled in the art. Located on the inner surface 25 of the segment is an optional plug 31. The plug may be used to form a housing in the tire tread for a stud pin.

Figure 2:
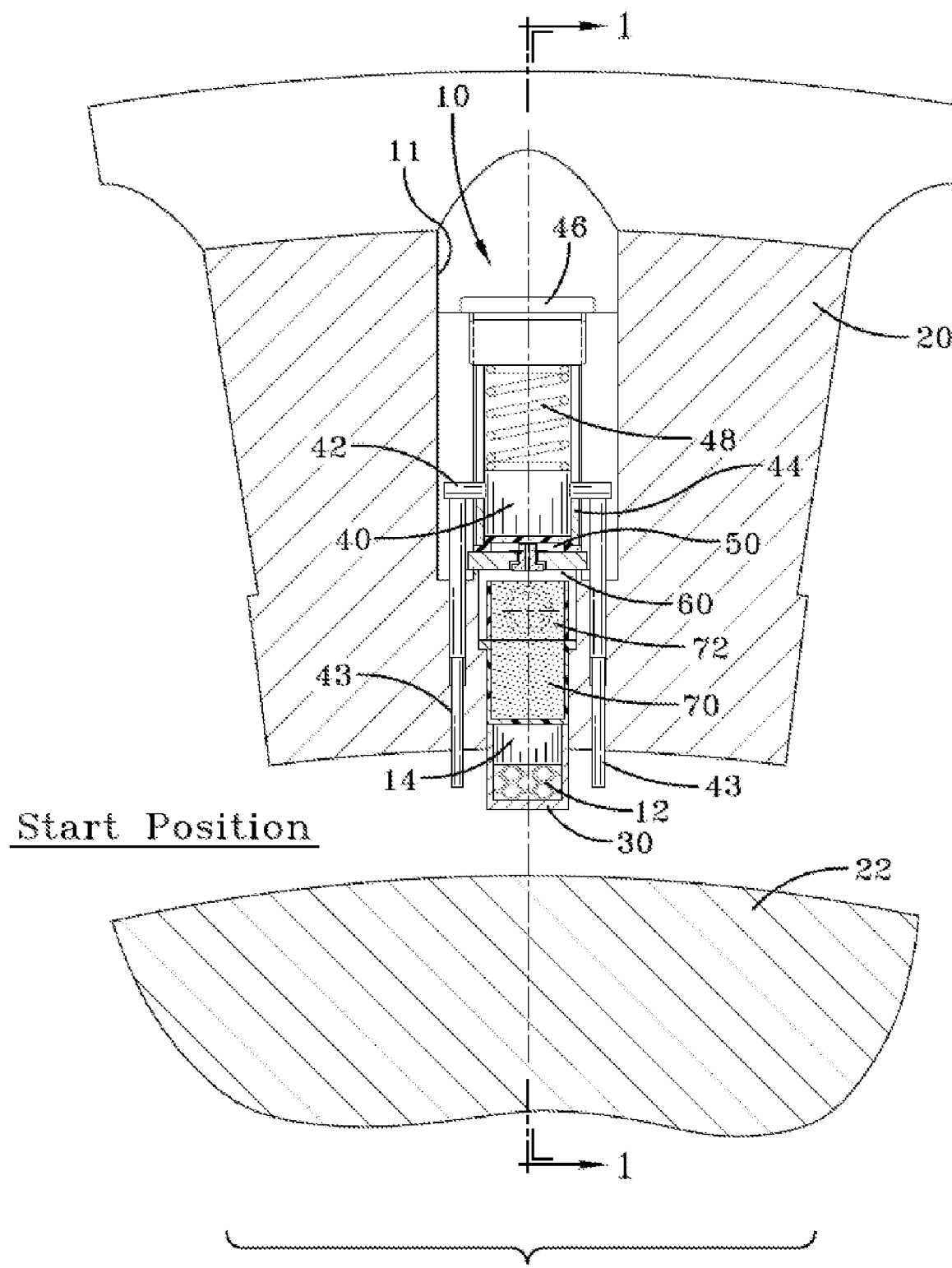
FIG. 2 is a cross-sectional view of FIG. 1 in the direction 2-2.
Figure 6:
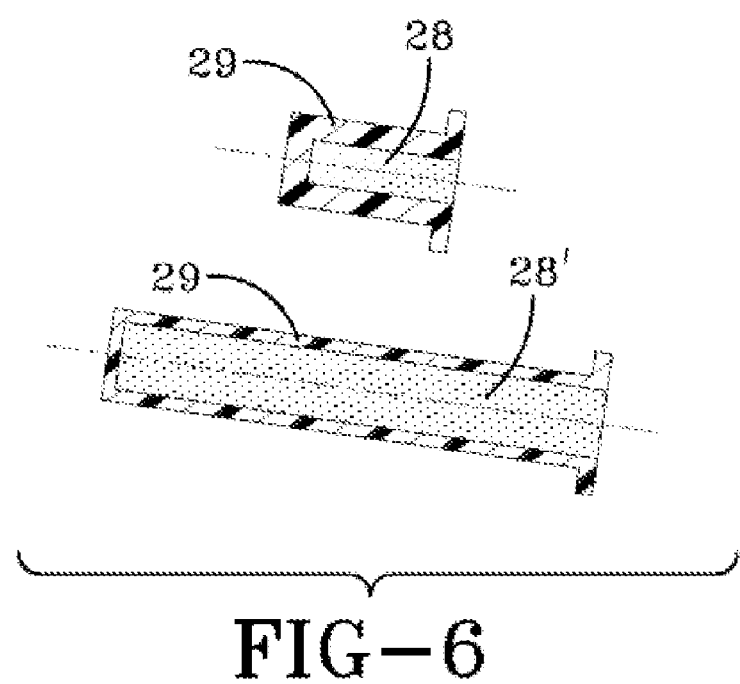
FIG. 6 is a view of the third member in the normal and flexed position.

FIGS. 1 and 2 illustrate a cross-sectional view of a portion of a tread segment, and sidewall plate shown in the open or start position. A green unvulcanized carcass tread T is shown positioned within the mold. The mold blade apparatus 10 has a retractable blade 54 for forming a hole in a green tire, and is shown in the retracted position in FIGS. 1 and 2. The retractable blade 54 is received within a cylindrical housing 51 which is contained within an axially oriented slot 13 formed in the shoulder area of the segment. The retractable blade 54 is biased into a retracted position by a compression spring 24. The retractable blade 54 has a bottom portion 26 which is engaged by the compression spring 24. The bottom portion 26 of the blade 54 is also in mating engagement with a first working member 28. Preferably the first working member 28 is encased in a silicone skin 29. The silicone skin 29 is elastic and acts like a spring to retract the retractable blade to its starting position in a faster time than without the skin as shown in FIG. 14. As shown in FIG. 6, the working member 28 fills up with a working material from a second chamber 60. The working material preferably has a viscosity in the range of about 800 to about 1200 MPas. One example of a material suitable for use as a working material is an RTV type silicone, which is in the form of a jelly or paste at room temperature. An RTV type silicone suitable for use as a working fluid is sold under the trade name Silgel 612 by Wacker Chemie AG. The silicone skin 29 is solid and elastic at room and elevated mold temperatures and has an elongation at break greater than or equal to 450%. The skin material may be RTV-M 536 sold by Wacker Chemie AG.

Figure 3:
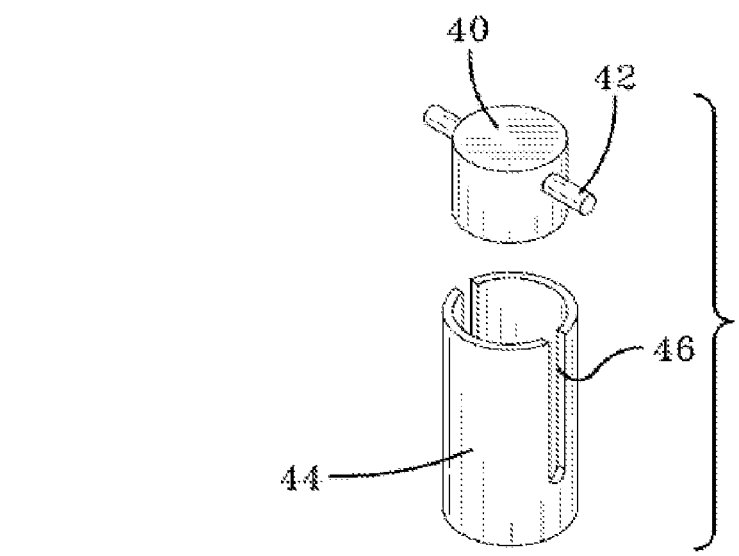
FIG. 3 is an exploded perspective view of a second piston and sleeve.

The mold blade apparatus 10 further includes a first piston 30 which is positioned in a radial slot 11 for engagement with the sidewall plate 22. The engagement of the first piston 30 with the sidewall plate 22 actuates the mold blade apparatus 10 when the mold segments are in the closed position as shown in FIG. 4. The mold blade apparatus further includes a wave spring 12 positioned within the first piston 30. A second piston 40 is received within the radial slot 11 and has a pin 42 received there through. The second piston 40 is received within a sleeve 44 and has an end cap 46 screwed thereon. As shown in FIG. 3, the pin 42 of second piston 40 slides within slots 46 of sleeve 44. The ends of pin 42 are connected to radially oriented pins 43. Pins 43 are positioned to engage the sidewall plate 22. Compression of pins 43 slides the second piston 40 radially outward, expanding a first chamber 50. The first chamber 50 is formed within the slot 11, between the second piston 40 and a plate 54. The first chamber 50 is preferably encased with silicone skin cap 53 to form a leak proof barrier. A compression spring 48 is positioned within the sleeve 44 and biases the second piston 40 away from the end cap 46 in a radially downwards direction. A third piston 14 is positioned between the first piston 30 and the second piston 40. Preferably, the first piston, second piston and third piston are aligned or coaxial.

Figures 4A, 4B:
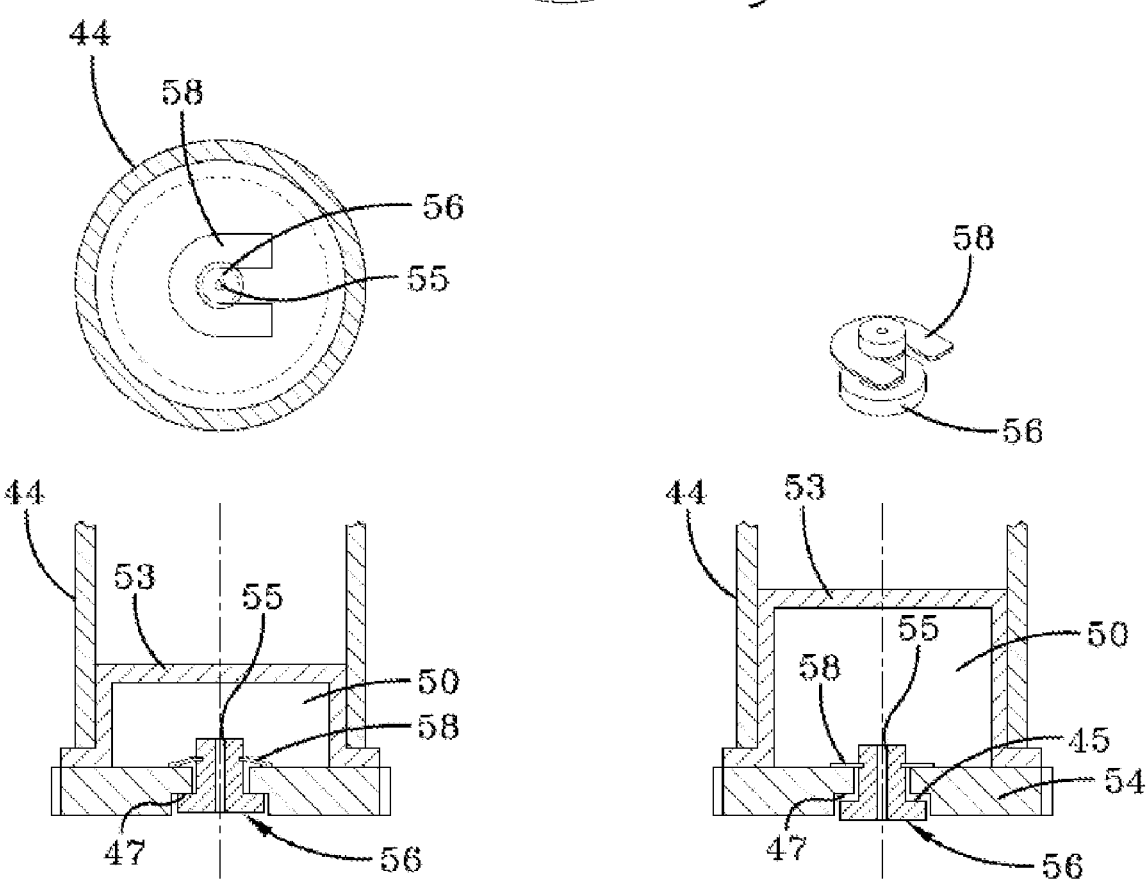
FIG. 4A is a cross-sectional view of a first chamber, T shaped member, u shaped spring and plate.
FIG. 4B is a cross-sectional view of a first chamber, T shaped member, u shaped spring and plate wherein the u shaped spring is flattened.

As shown in FIGS. 4A and 4B, the plate 54 has a center T shaped member 56 which is seated in a T shaped passageway by U shaped spring 58. The T shaped member 56 has an interior passageway 55 for passage of a working fluid from the first chamber 50 to a second chamber 60. FIG. 4A illustrates when the U shaped spring holds the T shaped member against the T shaped passageway so that flow is prevented in the T shaped passageway by engagement of the member 45 with the sidewalls 47. Flow is only permitted through center passageway 55. When the U shaped spring force is overcome as shown in FIG. 4B, flow may occur through the T shaped passageway and into the interior passageway 55, from the first chamber 50 to the second chamber 60. Thus the T shaped member 56 acts as a flow restrictor that is designed to allow only a small amount of flow when the fluid flows in a first direction. When the flow reverses direction, a much larger flow rate q may pass through the restrictor due to the restrictor being unseated from the channel edges that block off the outer flow paths. The larger flow rate allows rapid charging of the first chamber and a return to the initial position for restarting of the mold sequence.

Figure 5:
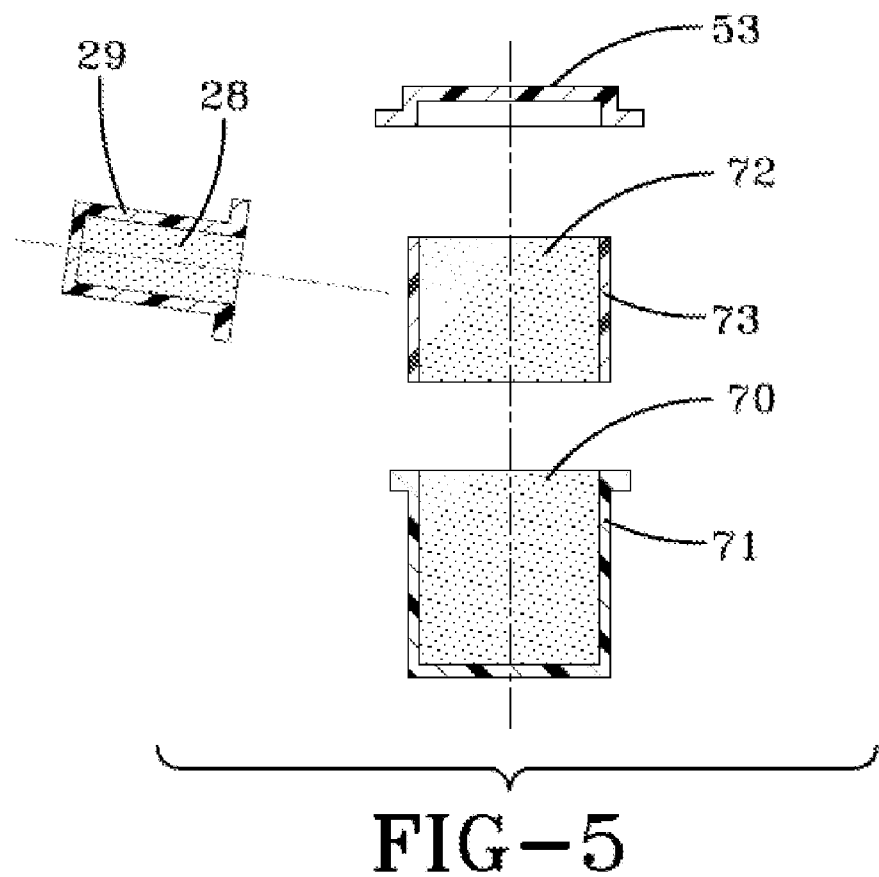
FIG. 5 are cross-sectional views of the silicone skins of the first, second and third member.

Positioned with the second chamber 60 is a second member 70 and a third member 72. The second and third member 70, 72 are preferably formed from a working material that has a viscosity in the range of about 800 to about 1200 MPas. One example of a material suitable for use as a working material is an RTV type silicone, which is in the form of a jelly or paste at room temperature. An RTV type silicone suitable for use as a working fluid is sold under the trade name Silgel 612 by Wacker Chemie AG. Preferably the second member 70 is contained within a silicone U shaped skin 71, as shown in FIG. 5. Preferably the third member 72 is also contained within a silicone skin 73, as shown in FIG. 5. The silicone skins 53, 71, 73 are solid and elastic and have an elongation at break greater than or equal to 450%. The silicone skin material may be RTV-M 536 sold by Wacker Chemie AG.

Figure 7:
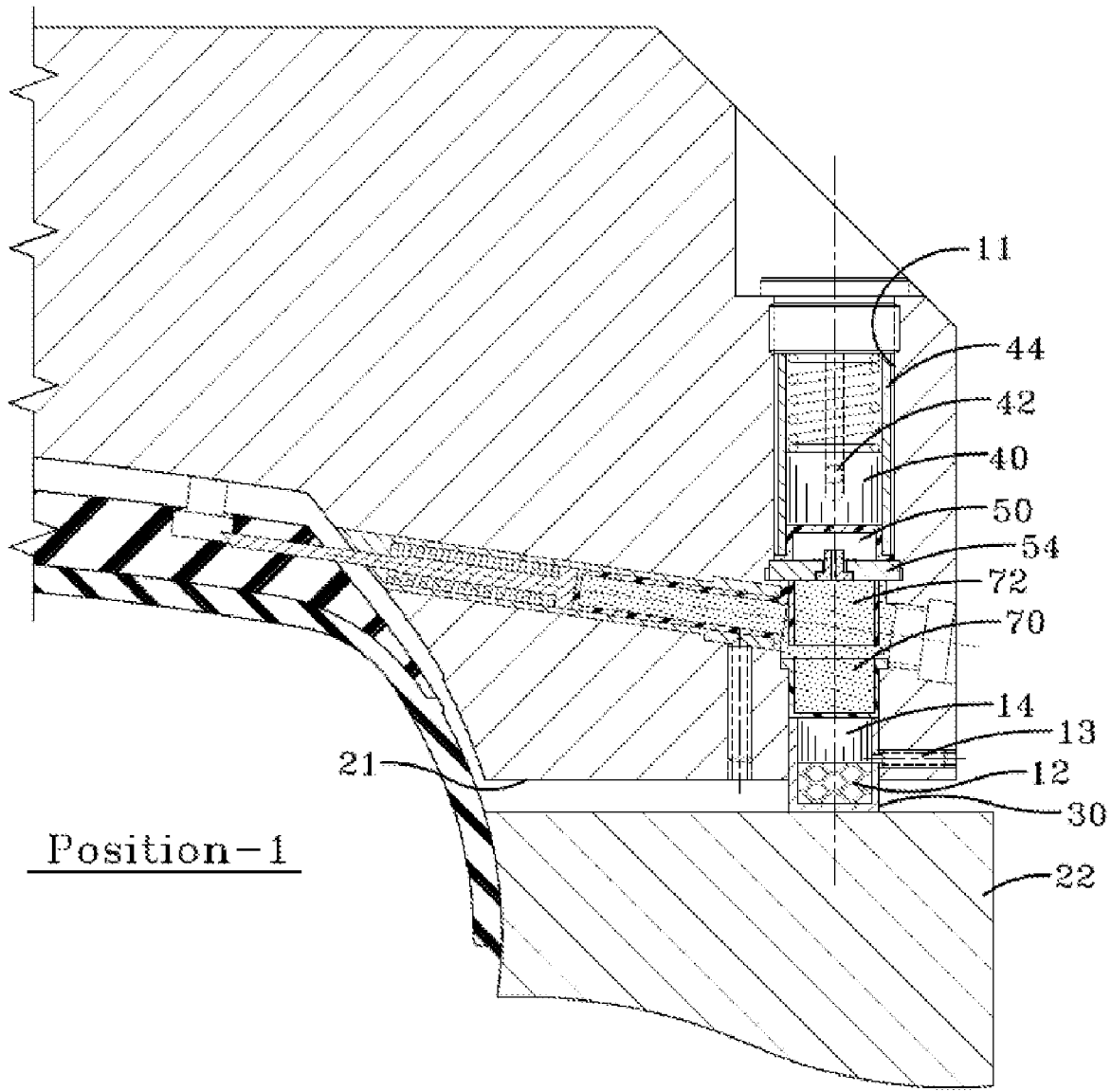
FIG. 7 is the apparatus of FIG. 1 shown in a partially closed position.

FIGS. 1 and 2 illustrate the molding device 10 in the start position wherein the blade 54 is retracted, and the first piston 30 is positioned for engagement with the sidewall plate 22. FIG. 7 illustrates the tread segment in a partially closed position. The first piston 30 engages sidewall plate 22. The two pins 43 on each side of the first piston 40 are in contact with the sidewall plate. The pins 43 push up the second piston 40, overcoming the force of the compression spring 48 to enlarge the first chamber 50. The first piston 30 and third piston 14 force the working material into the second chamber 60 and then into the skin 29 to move the retractable pin 52. As shown in FIG. 7, the retractable pin 52 is out of the tread segment at its maximum position, but the mold is not yet closed. A gap between the tread segment and the sidewall plate still exists.

Figure 8:
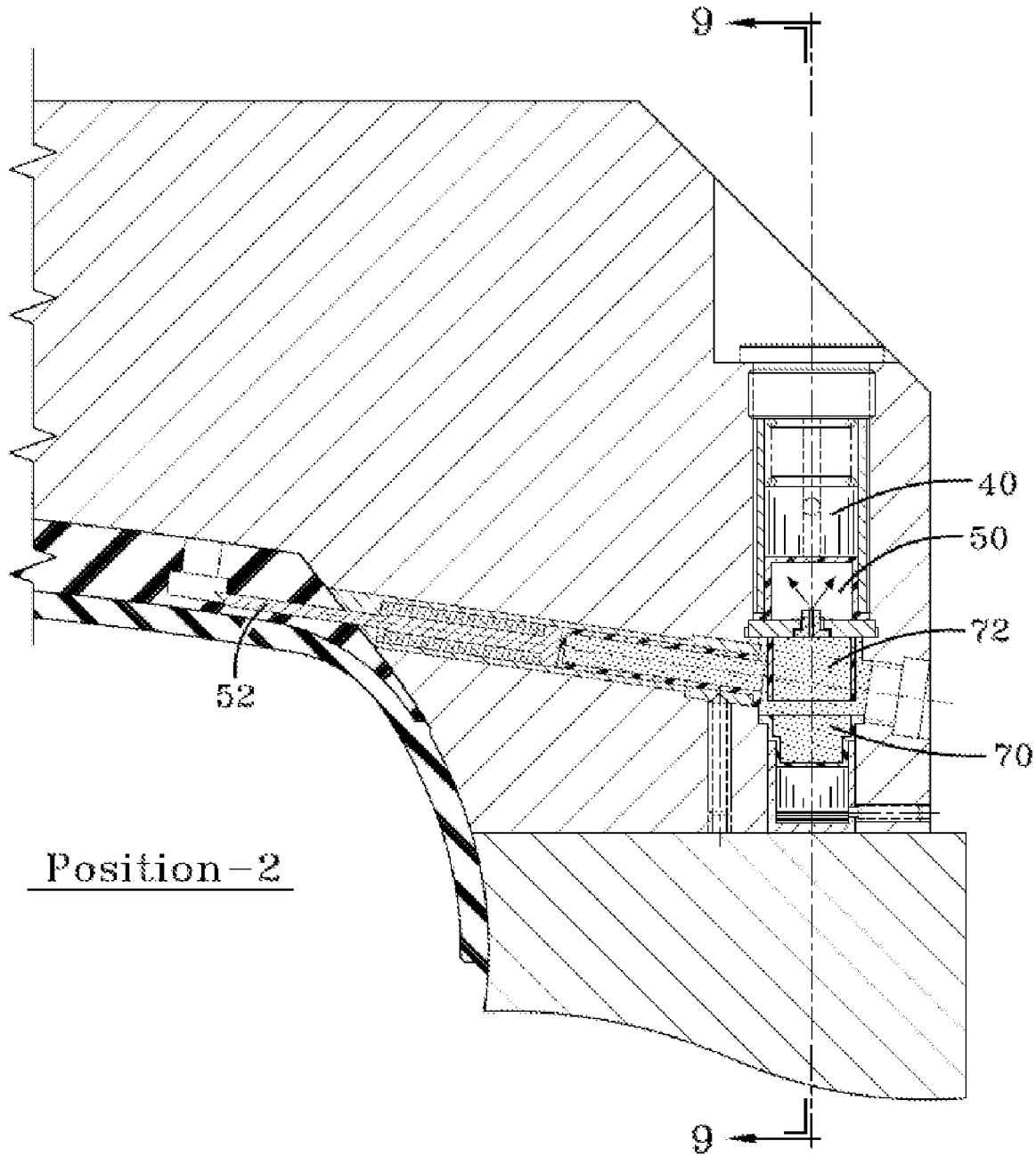
FIG. 8 is the apparatus of FIG. 1 shown in a fully closed position.
Figure 9:
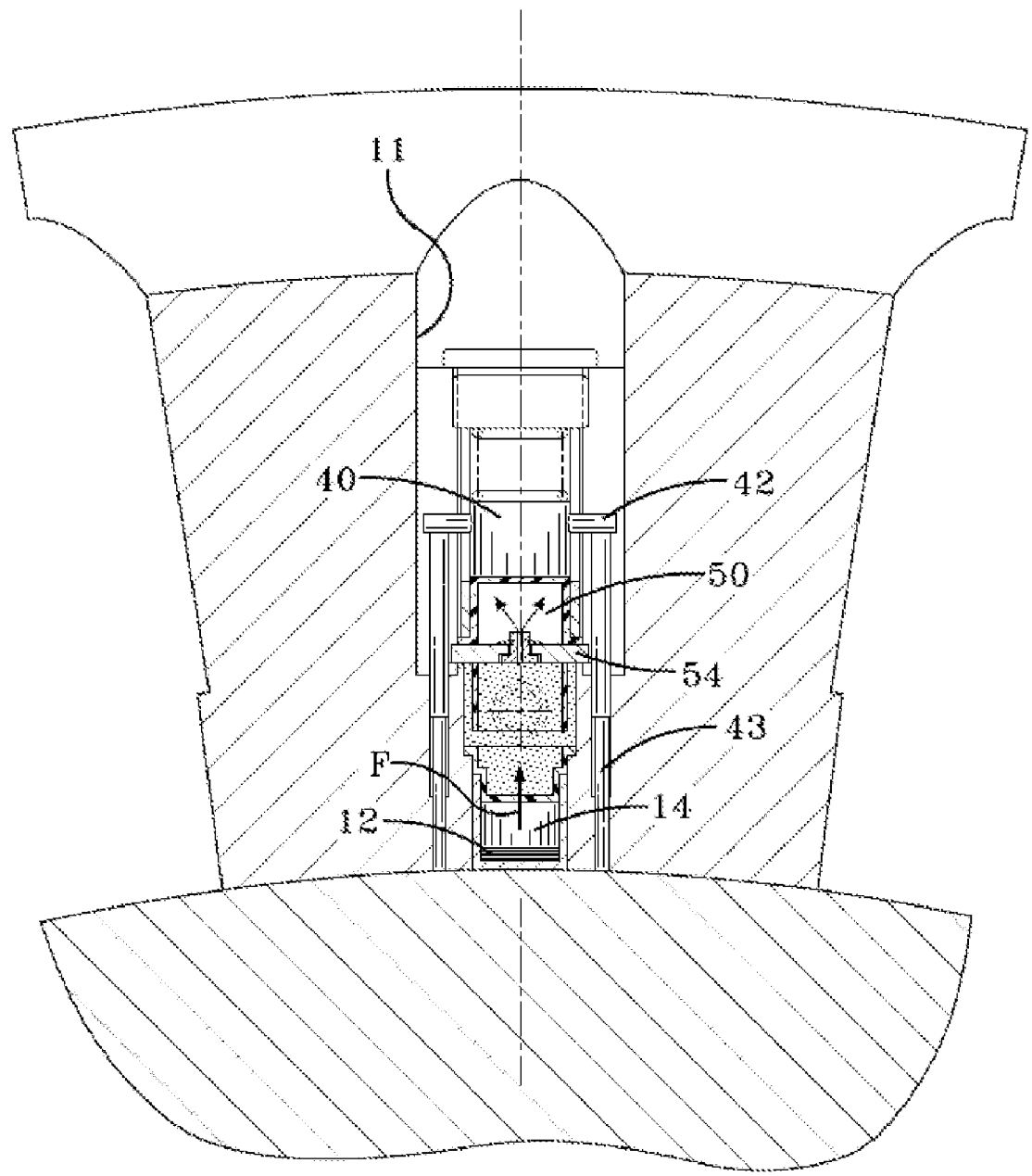
FIG. 9 is a cross-sectional view of FIG. 8 in the direction 9-9.

FIG. 8 illustrates the mold in a closed position. The waved springs 12 are compressed (the waved springs must be still compressed to ensure the variation of the silicone expansion) The spring force of the waved springs 12 must be greater than the compression spring force 24 to maintain the retractable pin 52 at its maximum position. The force of the waved springs acts on the working material, moving from chamber 60 to chamber 50 by the smaller orifice 55 of the T shaped member 56. The dimension of this orifice and the compression forces of the springs will be adjusted to respect the curing time.

Figure 10:
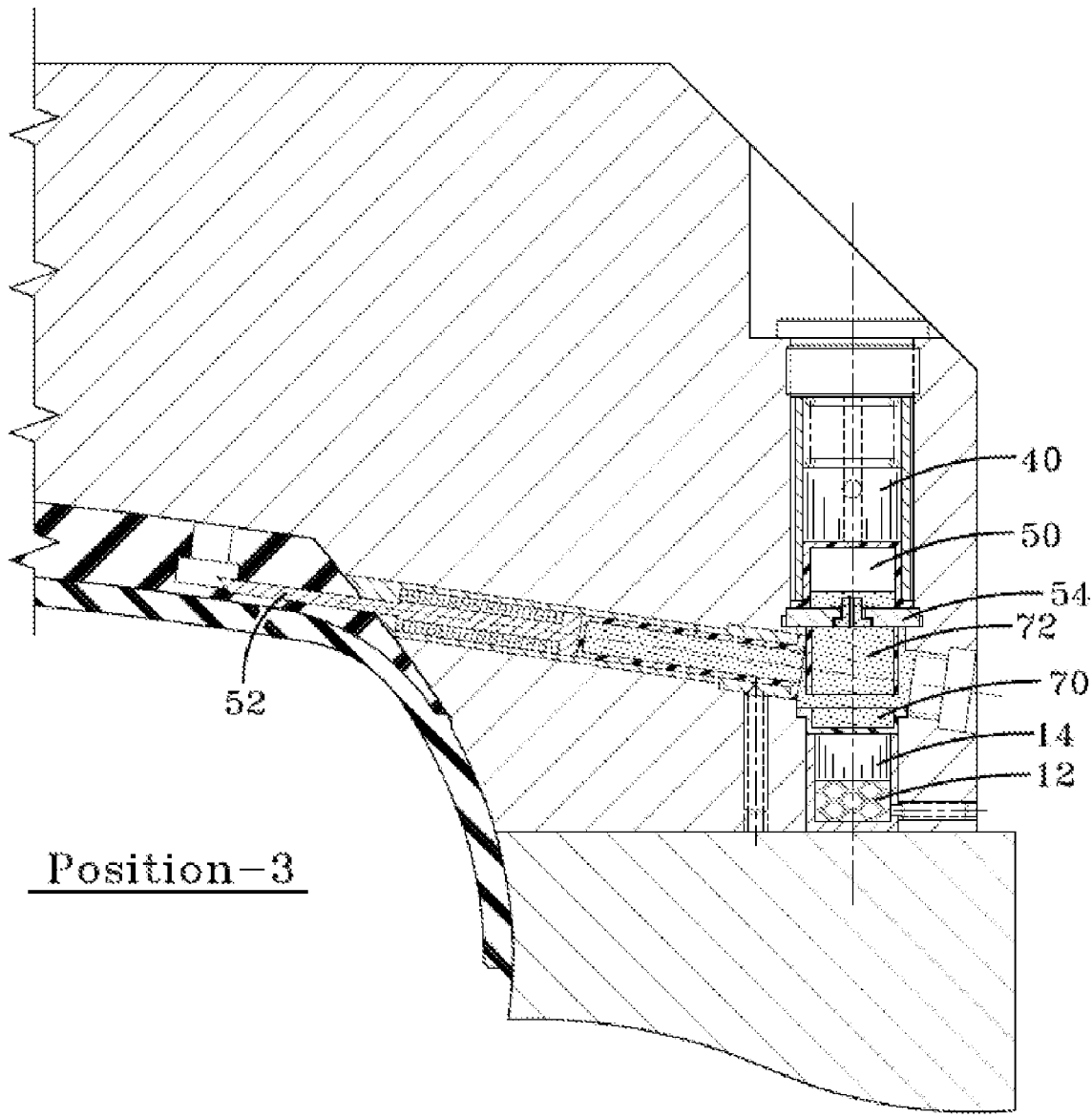
FIG. 10 illustrates the apparatus of FIG. 1 with the blade extended and the first chamber being filled up with the working fluid.
Figure 14A:
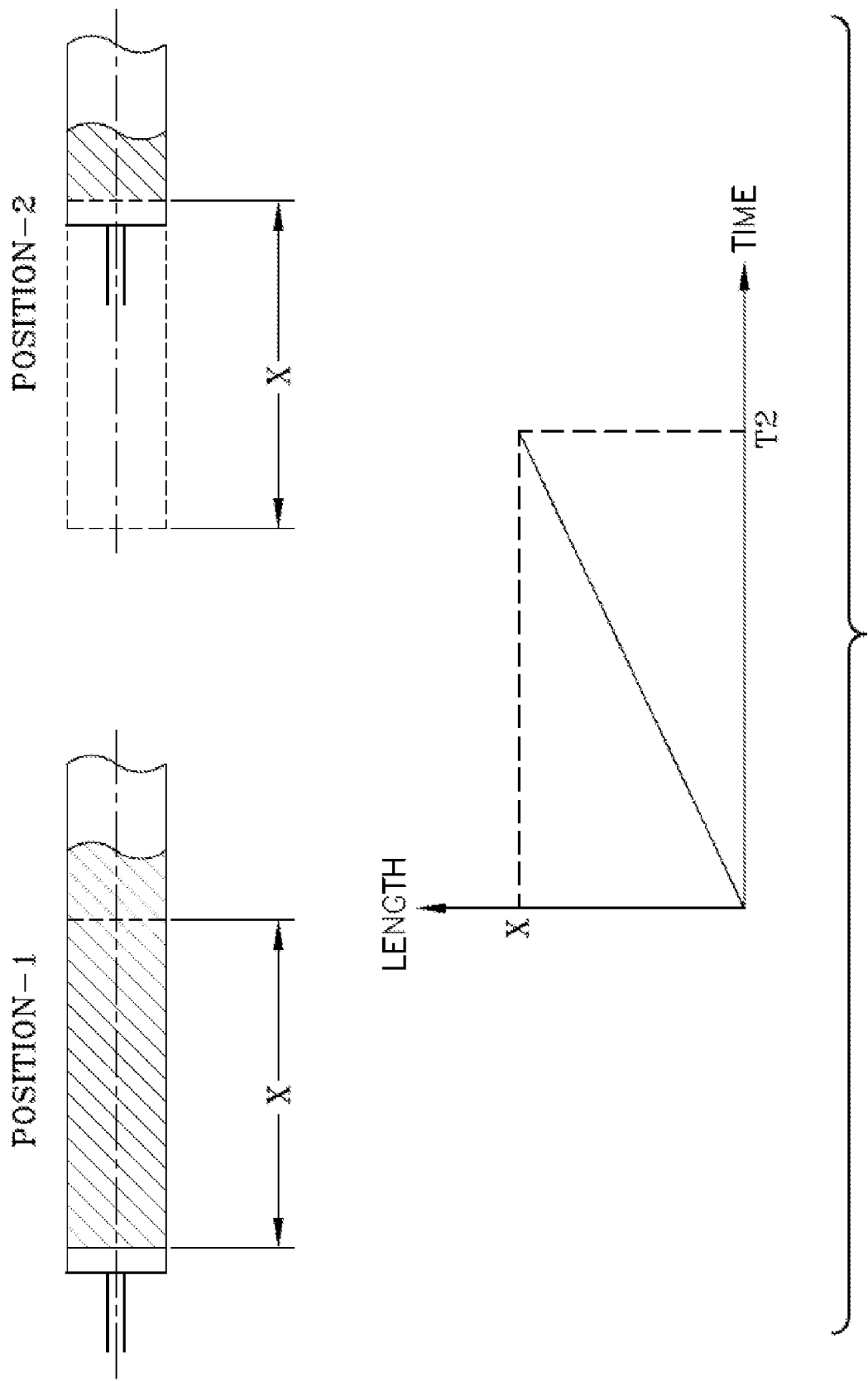
FIGS. 14A and 14B illustrate the time it takes a piston to travel a distance X, shown without a silicone skin (FIG. 14A) and with a silicone skin (FIG. 14B).
Figure 14B:
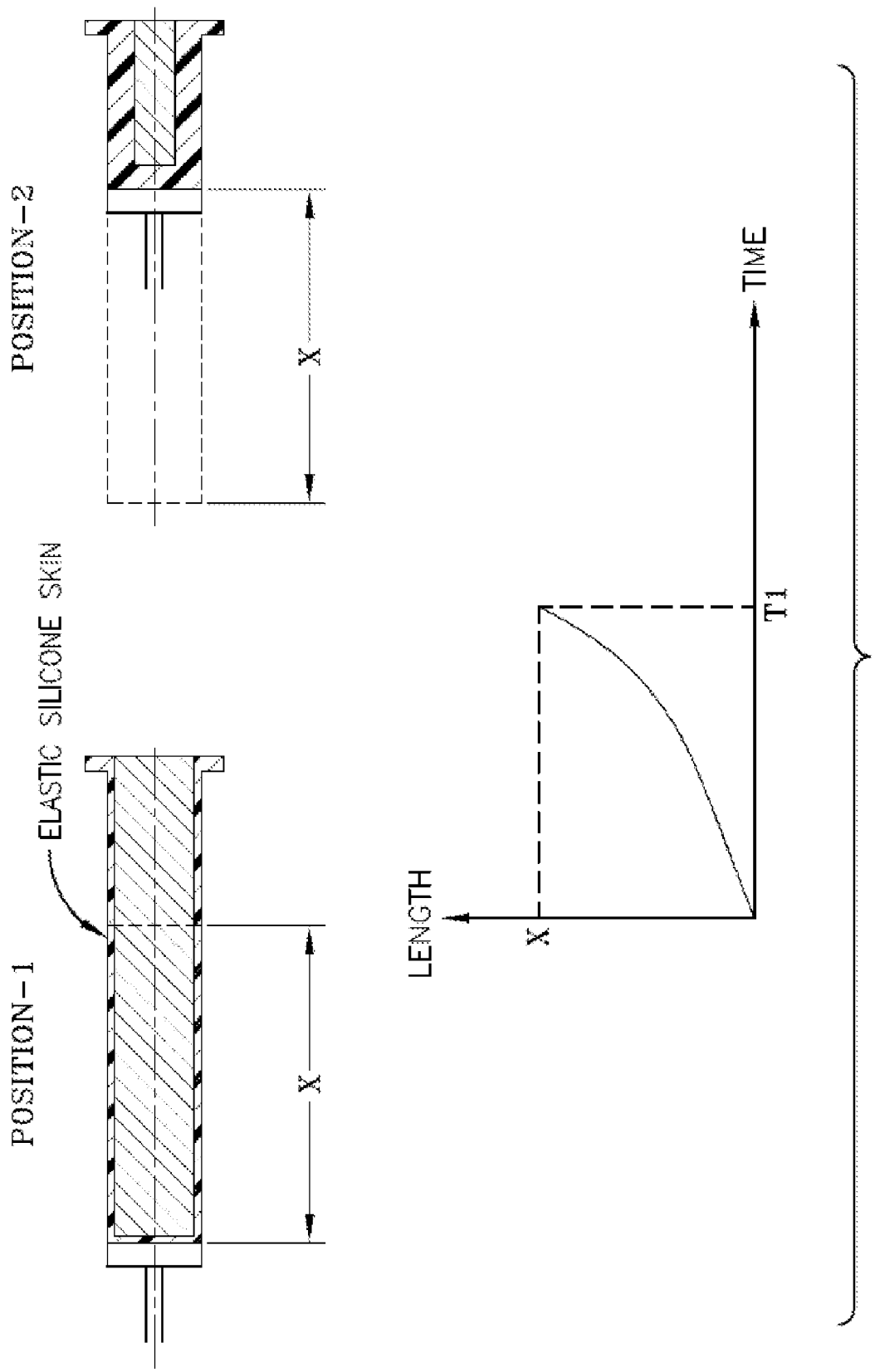

FIG. 10 illustrates the mold still in the closed position and the blade still in its extended position. The volume of the working material in the first chamber 50 is increasing, which decreases the force exerted on the waved springs. When the wave spring force is the same as the compression spring 24 force+elastic force of the skin 29, the retractable pin 52 is beginning its backwards movement. FIG. 14A illustrates the time T2 needed for a piston to travel a distance X, shown without a silicone skin. FIG. 14B illustrates the time it takes a piston (with a silicone skin) to travel a distance X. The piston with a silicone skin travels the distance faster because of the spring effect.

Figure 11:
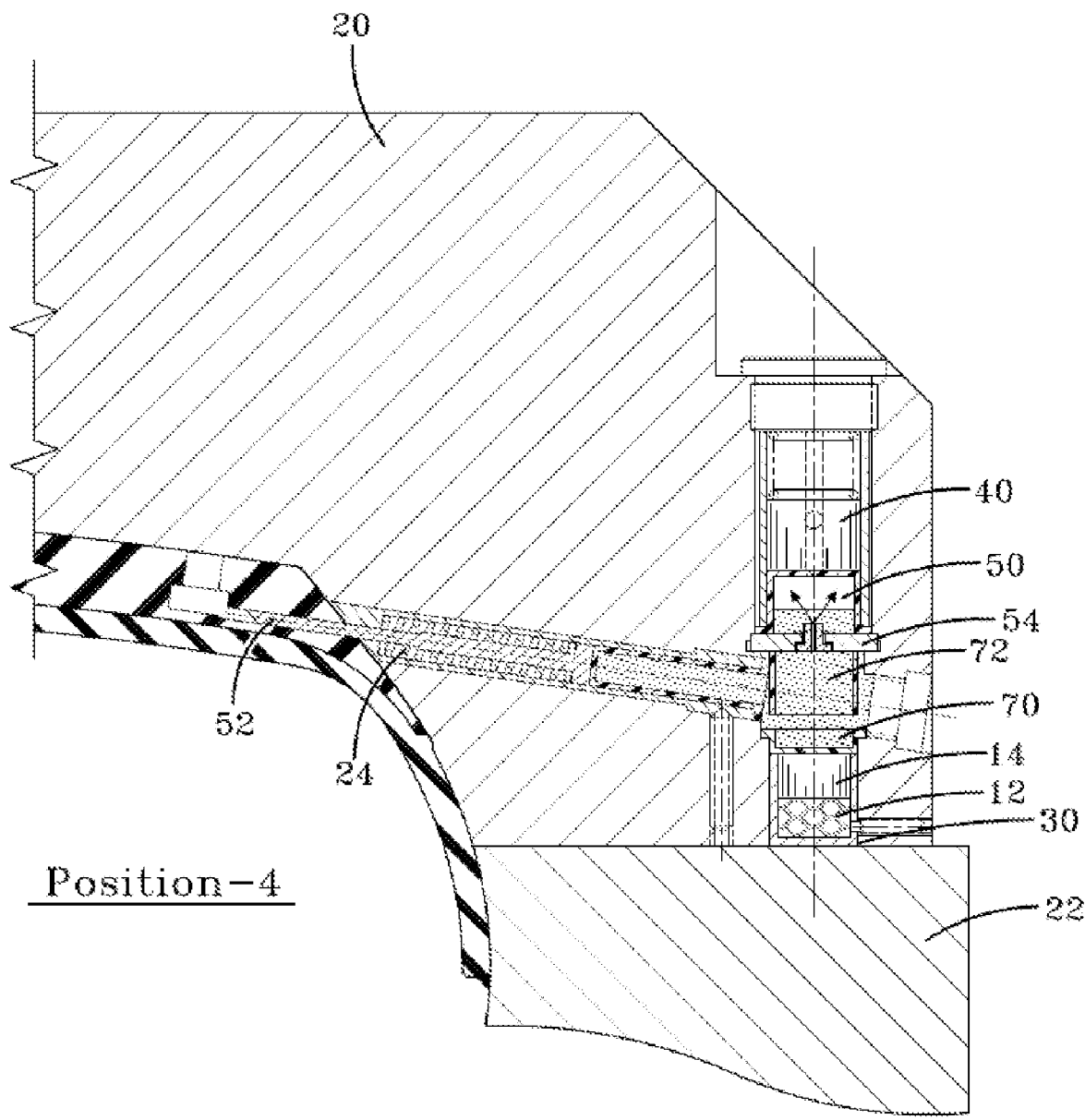
FIG. 11 illustrates the apparatus of FIG. 1 with the blade beginning to retract as the first chamber is filled up with the working fluid.
Figure 12:
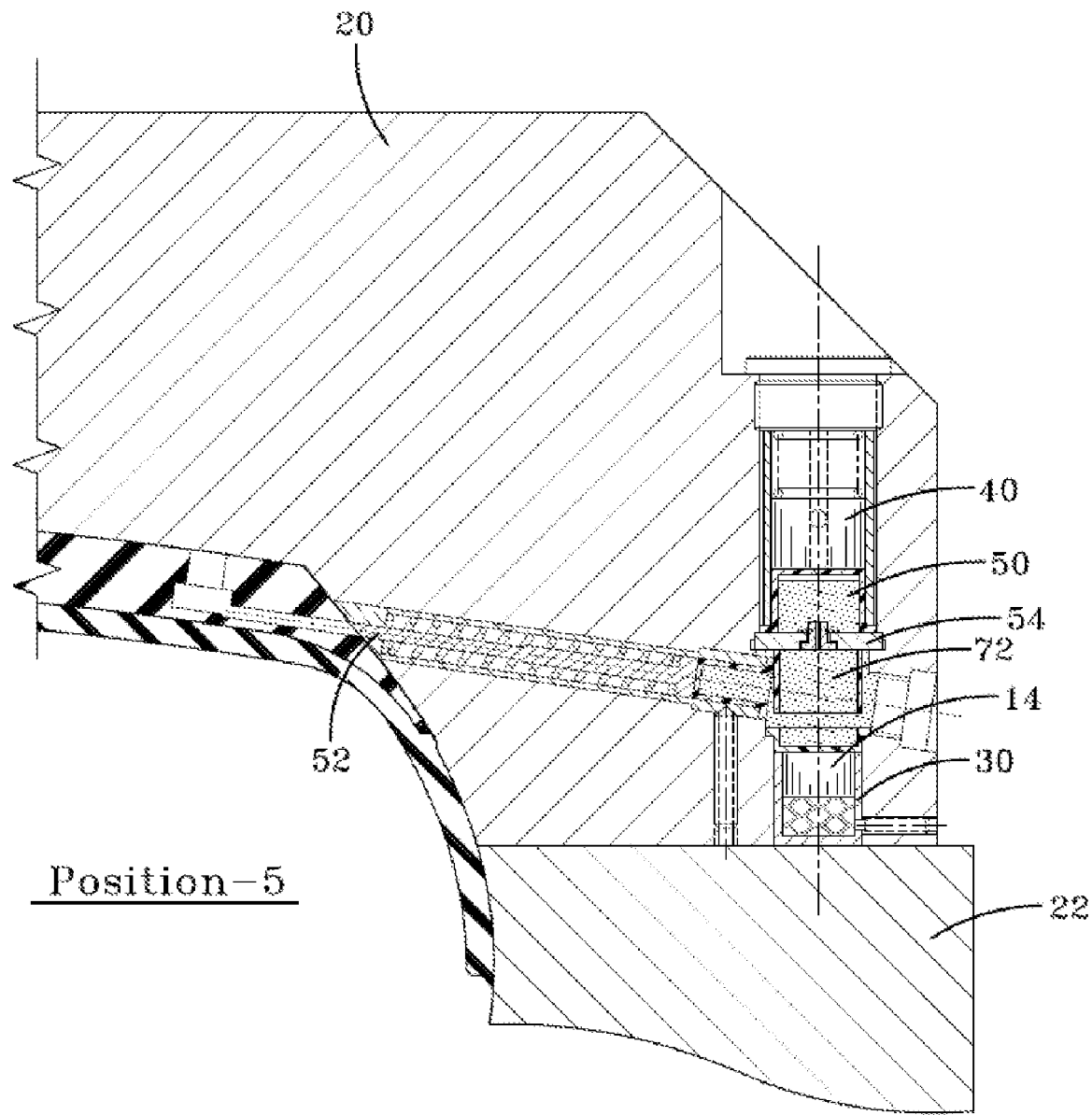
FIG. 12 illustrates the apparatus of FIG. 1 with the blade fully retracted as the first chamber is filled with fluid and the wave spring is expanded.

FIG. 11 illustrates the blade 54 retracting from the tire tread. The force of the compression spring 24 forces the working material from the first member 29 into the chamber 50. FIG. 12 illustrates that the pin 52 is fully retracted, which is timed with the end of the tire curing cycle. Chamber 50 is filled with the working material.

Figure 13:
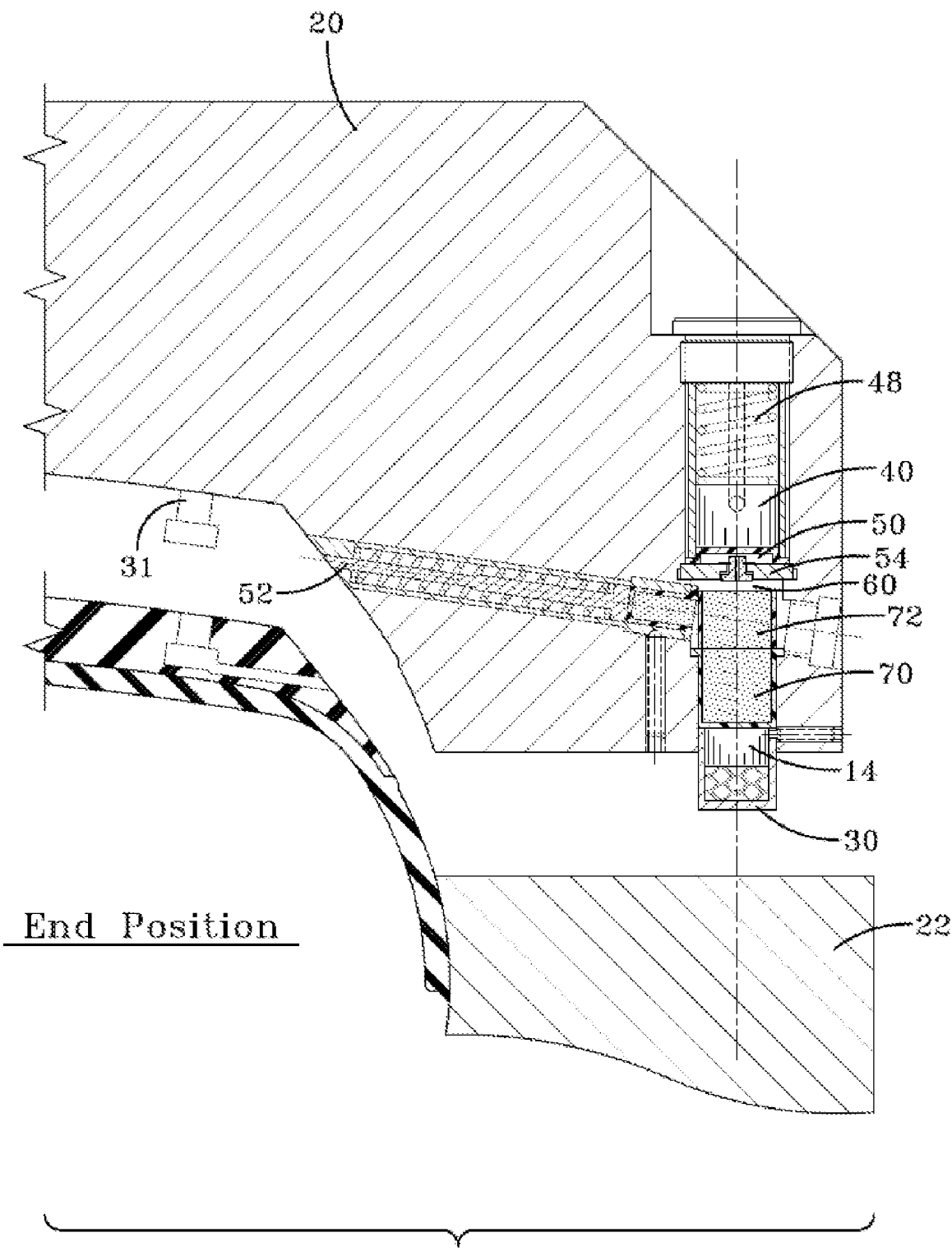
FIG. 13 illustrates the apparatus of FIG. 1 when the mold is opened.

FIG. 13 illustrates the end of the tire curing cycle and the mold is opened to remove the cured tire. The two pins 43 on each side of the second piston 40 no longer exert a force on the second piston 40. The compression spring 48 acts on the chamber 50, forcing the working material out of the chamber and into the second chamber 60. The U shaped spring 58 is compressed as shown in FIG. 4B, and the working fluid passes through passage 55 and through the T shaped passageway. The chamber 50 is emptied as the working fluid is returned to chamber 60, filling members 70, 72.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold device for use in a mold having a plurality of tread molding segments, each tread molding segment having an end face for mating with an adjoining tread molding segment, the mold device comprising: a piston mounted to at least one of the tread molding segments and actuated by the opening and closing of the mold, said piston is positioned within a first chamber; said first chamber further comprises a working material and spring, said piston having a plunger end in communication with the working material and the spring; said mold device further comprising a blade assembly having a distal end in fluid communication with a second chamber; said first chamber being is in fluid communication with the second chamber, wherein closing of the mold compresses the piston, forcing the working material to transfer from the first chamber to the second chamber, actuating the blade assembly.

2. The mold device of claim 1 further comprising a compression spring located about said blade assembly for biasing the blade assembly into a retracted position.

3. The mold device of claim 1 wherein the working material is formed of silicone.

4. The mold device of claim 1 further comprising a third chamber separated from said first chamber by a flow restricting device, said third chamber being in engagement with a second piston; a compression spring positioned adjacent said second piston for biasing the second piston into engagement with the third chamber.

5. The mold device of claim 4 wherein the flow restricting device has a passageway for allowing flow of working material when the working material flows in a first direction.

6. The mold device of claim 5 wherein the flow restricting device allows passage of a flow when the working material flows in a second direction opposite said first direction.

* * * * *